United States Patent [19]
Plichta et al.

[11] Patent Number: 5,273,846
[45] Date of Patent: Dec. 28, 1993

[54] IONICALLY CONDUCTIVE BILAYER SOLID ELECTROLYTE AND ELECTROCHEMICAL CELL INCLUDING THE ELECTROLYTE

[75] Inventors: Edward J. Plichta, Howell; Wishvender K. Behl, Ocean, both of N.J.

[73] Assignee: The United States of America as represented by the Secretary of the Army, Washington, D.C.

[21] Appl. No.: 65,332

[22] Filed: May 20, 1993

[51] Int. Cl.$^5$ .............................................. H01M 6/18
[52] U.S. Cl. ................................... 429/193; 429/191; 429/218; 429/219; 429/220; 429/221; 429/223; 429/224
[58] Field of Search ............... 429/219, 229, 193, 221, 429/191, 218, 192, 223, 224

[56] References Cited

U.S. PATENT DOCUMENTS 5,059,497 10/1991 Prince et al. .................... 429/193

FOREIGN PATENT DOCUMENTS 275356 7/1988 European Pat. Off.
289767 11/1988 Japan.

Primary Examiner—John S. Maples
Attorney, Agent, or Firm—Michael Zelenka; Roy E. Gordon

[57] ABSTRACT

An ionically conductive bilayer solid electrolyte is provided for use in an electrochemical cell wherein the electrolyte layers are adjoining and wherein one of the electrolyte layers is in contact with the anode of the cell and the adjoining electrolyte layer is in contact with the cathode of the cell.

6 Claims, 2 Drawing Sheets

IONICALLY CONDUCTIVE BILAYER SOLID ELECTROLYTE AND ELECTROCHEMICAL CELL INCLUDING THE ELECTROLYTE

GOVERNMENT INTEREST

The invention described herein may be manufactured, used, and licensed by or for the Government for governmental purposes without the payment to us of any royalties thereon.

FIELD OF INVENTION

The invention relates in general to rechargeable lithium electrochemical cells and in particular to rechargeable solid state lithium cells.

BACKGROUND OF THE INVENTION

Recently, a lithium ion conducting solid electrolyte having the general formula $Li_{3.6}Ge_{0.6}V_{0.4}O_4$ has been synthesized that has high ionic conductivity at high temperature and that can be used as an electrolyte for rechargeable lithium cells. However, experiments have indicated that this electrolyte is not stable in contact with lithium metal.

SUMMARY OF THE INVENTION

The general object of this invention is to provide a lithium rechargeable electrochemical cell that can use a bilayer electrolyte. A more particular object of the invention is to provide such an electrochemical system that can be used in mono or bipolar battery configurations as a low volume power source for electronic equipment, electric vehicle propulsion, and robotics as well as general portable devices requiring a high power density battery.

It has now been found that the aforementioned objects can be attained by including a lithium ionically conducting solid bilayer electrolyte at elevated temperatures in a rechargeable lithium solid state electrochemical cell. More particularly, according to the invention, a rechargeable lithium electrochemical system is provided including a lithium cobalt oxide cathode, a lithium metal or lithium alloy anode, and a lithium ionically conducting solid bilayer electrolyte at elevated temperatures. It has been found for example, that a $Li/LiI/Li_{3.6}Ge_{0.6}V_{0.4}O_4/LiCoO_2$ solid state cell can produce the desired results when operated at temperatures to about 250° C. The use of a lithium iodide layer on the lithium anode side is important since lithium metal is stable in contact with lithium iodide but lithium is not stable in contact with lithium germanium vanadium oxide or $Li_{3.6}Ge_{0.6}V_{0.4}O_4$. Lithium iodide, however, is not thermodynamically stable at the high voltages of $LiCoO_2$ that exceeds 4 volts. $Li_{3.6}Ge_{0.6}V_{0.4}O_4$, on the other hand, has an oxidation stability to greater than 4.5 V and therefore is stable with $LiCoO_2$. Thus, the use of a bilayer solid electrolyte permits the use of lithium metal as the anode and the high voltage $LiCoO_2$ as the cathode that results in a cell having a very high cell potential.

BRIEF DESCRIPTION OF THE DRAWING

Referring to FIG. 1, the electrochemical cell, 1, includes a bilayer electrolyte, 2, with a lithium anode, 3. The anode side layer, 4, of the bilayer includes a layer of lithium ion conducting lithium iodide while the cathode side layer, 5, includes the lithium ion conducting lithium germanium vanadium oxide $Li_{3.6}Ge_{0.6}V_{0.4}O_4$, solid electrolyte and lithium cobalt oxide, $LiCoO_2$, as the cathode, 6.

Referring to FIG. 2, a typical charge-discharge cycle of the solid bilayer electrolyte cell is shown. The cell is operated at 100° C. and charged at 5 $\mu A/cm^2$ and discharged at 10 $\mu A/cm^2$. The cell depicts a high open circuit potential of 3.9 V. During charge, lithium is deintercalated from the lithium cobalt oxide and is transported through the lithium ion conducting bilayer solid electrolyte and deposited on the lithium anode, and these electrode reactions are reversed on discharge. The electrode reactions may be represented as follows:

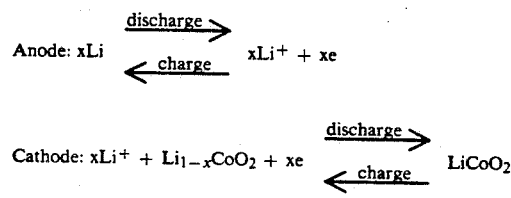

Figure 1:
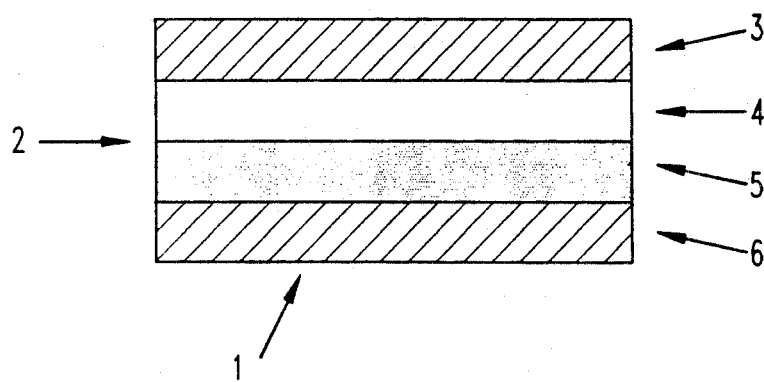
FIG. 1 shows a sketch of an electrochemical cell including a solid bilayer electrolyte.
Figure 2:
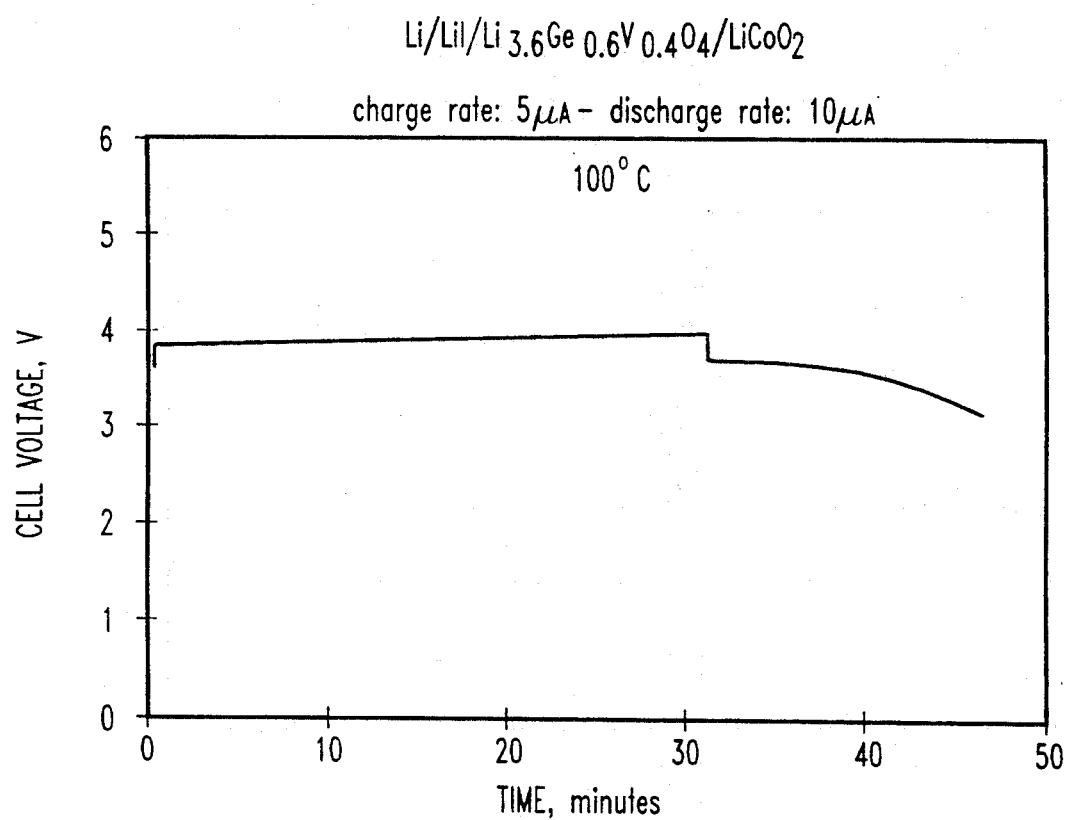
FIG. 2 shows a typical charge-discharge cycle of the new electrochemical cell.

and the total cell reaction is represented as:

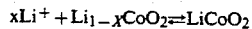

Other combinations of electrolyte can be substituted in the bilayer as well as other anode and cathode combinations. It is important in this connection that the two adjoining layers allow for the transport of an ion to travel between the anode and the cathode. In a lithium electrochemical cell where lithium iodide is the layer of the bilayer electrolyte in contact with the lithium anode, a particularly effective adjoining layer is a solid solution of $Li_3VO_4$ and $Li_4GeO_4$ having a composition of $Li_3VO_4$ ranging from 0 to 100 percent; particularly a composition represented as $Li_{3.6}Ge_{0.6}V_{0.4}O_4$.

In lieu of lithium as the anode, one can use at least one alkali metal such as sodium, potassium, rubidium, cesium, or francium. The anode can also be an ion intercalating material.

The cathode may be at least one transition metal oxide, sulfide, halide, selenide, or telluride such as $LiNiO_2$, $LiMnO_2$, $LiFeO_2$, $MnO_2$, $MoO_3$, $V_6O_{13}$, $V_2O_5$, $PbO_2$, $Ag_2O$, $Cr_3O_8$, $Cr_2O_5$, $VO_2$, $CuO$, $TiO_2$, $TiS_2$, $MoS_3$, $TiS_3$, $VS_2$, $V_2S_5$, $MoS_2$, $CoS_2$, $CrS_2$, $ZrS_2$, $HfS_2$, $NbS_2$, $WS_3$, $TaS_2$, $CuF_2$, $CaCl_2$, $NiF_2$, $CoF_2$, $CoCl_2$, $NiCl_2$, $FeCl_3$, or $CF_x$.

The anode may also be LiAl, LiSi, LiB, or $LiC_6$.

The anode may be an ion intercalating polymer and the cathode may be an ion intercalating polymer.

Moreover, the bilayer electrolyte may include two ionically conductive polymers. The bilayer electrolyte may also include adjoining layers of ionically conductive ceramics, compounds, materials, polymers, or elements.

We wish it to be understood that we do not desire to be limited to the exact details of construction as described for obvious modifications will occur to a person skilled in the art.

What is claimed is:

1. An ionically conductive bilayer solid electrolyte for use in a solid state electrochemical cell wherein the electrolyte layers are adjoining and wherein one of the electrolyte layers is for contact with the anode of the cell, and the other electrolyte layer is for contact with the cathode of the cell and wherein the electrolyte layer for contact with the anode is at least one member of the group consisting of LiI, LiN and a lithium substituted beta alumina and wherein the adjoining electrolyte layer for contact with the cathode of the cell is a solid solution of $Li_{3.6}Ge_{0.6}V_{0.4}O_4$ having a composition of $Li_3VO_4$ ranging from 0 to 100 percent.

2. An ionically conductive bilayer solid electrolyte for use in a solid state electrochemical cell wherein the electrolyte layers are adjoining and wherein one of the electrolyte layers is for contact with the anode of the cell, and the other electrolyte layer is for contact with the cathode of the cell and wherein the electrolyte layer for contact with the anode is at least one member of the group consisting of LiI, LiN and a lithium substituted beta alumina and wherein the adjoining electrolyte layer for contact with the cathode of the cell is a solid solution of $Li_{3.6}Ge_{0.6}V_{0.4}O_4$ having a composition of $Li_3VO_4$ ranging from 0 to 100 percent and where the bilayer electrolyte is LiI and $Li_{3.6}Ge_{0.6}V_{0.4}O_4$.

3. A solid state electrochemical cell including an anode, a cathode spaced from said anode, and an ionically conductive bilayer solid electrolyte in the space between said anode and cathode, wherein the electrolyte layers are adjoining and wherein one of the electrolyte layers is in contact with the anode of the cell and the adjoining electrolyte layer is in contact with the cathode of the cell and wherein the anode is at least one member of the group consisting of Li, Na, K, Rb, Cs, Fr, LiAl, LiSi, LiB, and $LiC_6$, wherein the cathode is at least one member of the group consisting of $LiNiO_2$, $LiMnO_2$, $LiFeO_2$, $MnO_2$, $MoO_3$, $V_6O_{13}$, $V_2O_5$, $PbO_2$, $Ag_2O$, $Cr_3O_8$, $Cr_2O_5$, $VO_2$, $CuO$, $TiO_2$, $TiS_2$, $MoS_3$, $TiS_3$, $VS_2$, $V_2S_5$, $MoS_2$, $CoS_2$, $CrS_2$, $ZrS_2$, $HfS_2$, $NbS_2$, $WS_3 TaS_2$, $VSe_2$, $NbSe_3$, $TfSe_2$, $CuF_2$, $CaCl_2$, $NiF_2$, $CoF_2$, $CoCl_2$, $NiCl_2$, $FeCl_3$, and $CF_x$, and wherein the bilayer electrolyte is adjoining layers of LiI and a solid solution of $Li_3VO_4$ ranging from 0 to 100% and represented as $Li_{3.6}Ge_{0.6}V_{0.4}O_4$.

4. A solid state electrochemical cell including an anode, a cathode spaced from said anode, and an ionically conductive bilayer solid electrolyte in the space between said anode and cathode, wherein the electrolyte layers are adjoining and wherein one of the electrolyte layers is in contact with the anode of the cell and the adjoining electrolyte layer is in contact with the cathode of the cell and wherein the anode is at least one member of the group consisting of $LiNiO_2$, $LiMnO_2$, $LiFeO_2$, $MnO_2$, $MoO_3$, $V_6O_{13}$, $V_2O_5$, $PbO_2$, $Ag_2O$, $Cr_3O_8$, $Cr_2O_5$, $VO_2$, $CuO$, $TiO_2$, $TiS_2$, $MoS_3$, $TiS_3$, $VS_2$, $V_2S_6$, $MoS_2 CoS_2$, $CrS_2$, $ZrS_2$, $HfS_2$, $NbS_2$, $WS_3$, $TaS_2$, $VSe_2$, $NbSe_3$, $TiSe_2$, $CuF_2$, $CaCl_2$, $NiF_2 CoF_2$, $CoCl_2$, $NiCl_2$, $FeCl_3$, and $CF_x$, and wherein the bilayer electrolyte is adjoining layers of LiI and a solid solution of $Li_3VO_4$ ranging from 0 to 100% and represented as $Li_{3.6}Ge_{0.6}V_{0.4}O_4$ and wherein the electrochemical cell includes lithium as the anode, $LiCoO_2$ as the cathode, and a bilayer electrolyte of LiI and $Li_{3.6}Ge_{0.6}V_{0.4}O_4$.

5. A solid state electrochemical cell including an anode, a cathode spaced from said anode, and an ionically conductive bilayer solid electrolyte in the space between said anode and cathode, wherein the electrolyte layers are adjoining and wherein one of the electrolyte layers is in contact with the anode of the cell and the adjoining electrolyte layer is in contact with the cathode of the cell, wherein the anode is at least one member of the group consisting of Li, Na, K, Rb, Cs, Fr, LiAl, LiSi, LiB, and $LiC_6$, wherein the cathode is at least one member of the group consisting of $LiNiO_2$, $LiMnO_2$, $LiFeO_2$, $MnO_2$, $MoO_3 V_6O_{13}$, $V_2O_5$, $PbO_2$, $Ag_2O$, $Cr_3O_8$, $Cr_2O_5$, $VO_2$, $CuO$, $TiO_2$, $TiS_2$, $MoS_3$, $TiS_3$, $VS_2$, $V_2S_5$, $MoS_2$, $CoS_2$, $CrS_2$, $ZrS_2$, $HfS_2$, $NbS_2$, $WS_3$, $TaS_2$, $VSe_2$, $NbSe_3$, $TiSe_2$, $CuF_2$, $CaCl_2$, $NiF_2$, $CoF_2$, $CoCl_2$, $NiCl_2$, $FeCl_3$, and $CF_x$, and wherein the bilayer electrolyte is adjoining layers of LiI and a solid solution of $Li_3VO_4$ ranging from 0 to 100% and represented as $Li_{3.6}Ge_{0.6}V_{0.4}O_4$ including LiAl as the anode, $LiCoO_2$ as the cathode, and a bilayer electrolyte of LiI and $Li_{3.6}Ge_{0.6}V_{0.4}O_4$.

6. A solid state electrochemical cell including an anode, a cathode spaced from said anode, and an ionically conductive bilayer solid electrolyte in the space between said anode and cathode, wherein the electrolyte layers are adjoining and wherein one of the electrolyte layers is in contact with the anode of the cell and the adjoining electrolyte layer is in contact with the cathode of the cell, wherein the anode is at least one member of the group consisting of $LiNiO_2$, $LiMnO_2$, $LiFeO_2$, $MnO_2$, $MoO_3$, $V_6O_{13}$, $V_2O_5$, $PbO_2$, $Ag_2O$, $Cr_3O_8$, $Cr_2O_5$, $VO_2$, $CuO$, $TiO_2$, $TiS_2$, $MoS_3$, $TiS_3$, $VS_2$, $V_2S_5$, $MoS_2$, $CoS_2$, $CrS_2$, $ZrS_2$, $HfS_2$, $NbS_2$, $WS_3$, $TaS_2$, $VSe_2$, $NbSe_3$, $TiSe_2$, $CuF_2$, $CaCl_2$, $NiF_2$, $CoF_2$, $CoCl_2$, $NiCl_2$, $FeCl_3$, and $CF_x$, and wherein the bilayer electrolyte is adjoining layers of LiI and a solid solution of $Li_3VO_4$ ranging from 0 to 100% and represented as $Li_{3.6}Ge_{0.6}V_{0.4}O_4$ including $LiC_6$ as the anode, $LiCoO_2$ as the cathode, and a bilayer electrolyte of LiI and $Li_{3.6}Ge_{0.6}V_{0.4}O_4$.

* * * * *